United States Patent [19]

Daftary

[11] 4,255,532
[45] Mar. 10, 1981

[54] ACRYLIC POLYMER COMPOSITION FOR MELT-SPINNING

[75] Inventor: Shashikumar H. Daftary, Pensacola, Fla.

[73] Assignee: American Cyanamid Company, Stamford, Conn.

[21] Appl. No.: 12,980

[22] Filed: Feb. 21, 1979

[51] Int. Cl.² .................. C08F 16/06; C08L 51/06; C08L 33/24; C08L 33/20
[52] U.S. Cl. ................................ 525/59; 526/202
[58] Field of Search ...................... 260/881; 525/59

[56] References Cited

U.S. PATENT DOCUMENTS 3,256,252 6/1966 Kruckenberg et al. ............ 260/79.3
4,101,621 7/1978 Yamamoto et al. ................. 260/881

FOREIGN PATENT DOCUMENTS

| 557251 | 5/1958 | Canada | 260/881 |
| 733093 | 7/1955 | United Kingdom | 260/881 |
| 871192 | 6/1961 | United Kingdom | 260/881 |

Primary Examiner—Carman J. Seccuro
Attorney, Agent, or Firm—William J. Van Loo

[57] ABSTRACT

A combination of a major amount of acrylonitrile and a minor amount of another monomer copolymerizable with acrylonitrile when grafted onto polyvinyl alcohol provides an improved acrylonitrile polymer for preparing fiber by extruding a fusion melt of such polymer and water.

4 Claims, No Drawings

ACRYLIC POLYMER COMPOSITION FOR MELT-SPINNING

This invention relates to an acrylonitrile polymer composition useful for spinning acrylonitrile polymer fibers. Moere particularly, this invention relates to such a polymer composition wherein a major proportion of acrylonitrile and a minor amount of at least one comonomer is grafted into a minor proportion of poly(-vinylalcohol).

An ideal procedure for preparing synthetic fiber is by melt spinning. In this procedure a pure polymer is heated at atmospheric pressure to its melting point and above to provide a fluid melt which is extruded through a spinneret to form filaments which are subsequently cooled to solidify the polymer and further processed as necessary. This procedure is used commercially to prepare nylon and polyester fibers.

Acrylonitrile polymer fiber is highly desirable for many reasons including its esthetics and dyeability. This fiber is prepared commercially by either wet or dry spinning procedures. In both of these procedures the fiber-forming polymer is dissolved in a suitable polymer solvent to provide the fluid spinning composition necessary for extrustion. In wet spinning the fluid extrudate is precipitated in solid form by using a liquid coagulant which dilutes and washes out the polymer solvent. In dry spinning the fluid extrudate is converted to solid form by evaporating the solvent therefrom.

In using suitable solvents to dissolve the acrylonitrile polymer, the spinning procedures require the use of high molecular weight polymers to provide fiber of desirable physical properties. The high molecular weight polymers require extensive dilution of their solvent solutions to provide spinning compositions that have the proper flow characteristics for extrusion. As a result, less than about one third of the composition becomes fiber and the balance is removed as solvent. In order to make these spinning procedures economical and to prevent extensive environmental pollution, it is necessary to employ solvent recovery systems in association with processing. These solvent recovery systems add to the cost of processing and complicate operations.

It would be desirable to provide acrylonitrile polymer fiber by melt spinning a pure polymer melt but this is not possible since the polymer deteriorates or decomposes at temperatures well below its melt point. For this reason recourse was had to either wet or dry spinning procedures.

Much effort has been directed to eliminating polymer solvents in spinning acrylonitrile polymer fiber. Particular interest was shown in using non-solvents and particularly water as a processing aid. Certain of these developments have been reported in the patent literature and are discussed below. Certain of the teachings are conflicting and tend to complicate development of a suitable process for preparing acrylonitrile polymer fiber using non-solvent processing aids.

Coxe, in U.S. Pat. No. 2,585,441 issued Feb. 12, 1952, (DuPont), recognized that the solvent requirements of wet and dry spinning procedures entailed expensive solvent recovery systems which desirably could be eliminated by proper use of non-solvent impregnants for the polymer. Coxe found that by using water as the polymer impregnant, hydrostatic extrusion could be more easily accomplished than when no polymer impregnant was employed. At the high hydrostatic pressure employed by Coxe, some polymer fusion occurred and, as Blickenstaff later reported (see below), the monofil obtained was sintered and full of voids.

In U.S. Pat. No. 3,388,202 issued June 11, 1968 to Opferkuch and Ross (Monsanto), it was disclosed that when an acrylonitrile polymer and water were heated under autogenous pressure to suitable temperature a polymer melt was obtained at a temperature below the degradation temperature of the polymer. At the water contents employed by the patentees a single phase melt of polymer and water was obtained. The patentees also taught that processing of the melt such as in the spinning of fiber would cause difficulties due to the pressure requirements.

In U.S. Pat. No 3,402,231 issued Sept. 17, 1968 to Bynum, Baur and Thompson (Monsanto), it was taught that if an acrylonitrile polymer-water melt containing excess waater as an additional phase was extruded at elevated temperature and pressure through a spinneret into the atomosphere, a fibrillated extrudate suitable for use in making paper was obtained. It was further taught that if a jet of high pressure steam was directed at the cross-section of the extrudate as it emerged from the spinneret, greater fibrillation would occur and the individual fibrils would be prevented from sticking together.

In U.S. Pat. No. 3,984,601 issued Oct. 5, 1976 to Blickenstaff (DuPont), there was disclosed a procedure to measure the range of water content that would provide the single phase fusion melt of acrylonitrile polymer and water discovered by Opferkuch and Ross. Blickenstaff taught spinning the melt through a spinneret into a dry-spinning environment to obtain fiber that was characterized by a sheath-core structure with a density gradient across the sheath, longitudinal striations along the fiber length as a result of subsequent stretching of the solidified fiber, optical voids within the core portion and a luster source due to reflective interfaces. The fiber had poor loop properties as well as poor dye intensity and high shade change of dyed fiber due to hot-wet processing because of its opaque nature. During the prosecution of the Blickenstaff reference, the nature of the Coxe product was characterized. It was subsequently learned through Turner (see below) that the process taught by Blickenstaff could not be scaled up to commercial levels of production due to polymer degradation problems.

In U.S. Pat. No. 3,896,204, issued July 22, 1975 to Goodman and Suwyn (DuPont), there was disclosed an improvement in the Blickenstaff process which comprised adding a small quantity of polymer solvent to the polymer-water melt. In this manner, the loop properties of the fiber were improved somewhat. However, the use of such a polymer solvent was contradictory to the basic aim of eliminating polymer solvent and recovery problems associated therewith. Additionally the reference did not teach any further improvement in the Blickenstaff process or fiber so that the latter remained commercially unacceptable.

In British Pat. No. 1,446,649 issued Aug. 18, 1976 to Turner (DuPont), the inability of the Blickenstaff process to be scaled up to commercial production levels due to polymer degradation was disclosed. Turner taught that by coupling polymer preparation in melt form with extrusion of the polymer melt thus formed, polymer degradation could be reduced. However, no improvements in fiber properties over those obtained by Blickenstaff were taught and a commercially acceptable fiber was not produced.

At this stage of development, the prior art teaches that a single phase polymer-melt was extrudable, but no effort was made to control water removal from the nascent extrudate. In forming the melt, a solid polymer phase and a liquid water phase were heated under at least autogenous pressure to sufficient temperature to form a composition which became a single phase melt. While the polymer-water was maintained at suitable conditions of temperature and pressure, the single phase fusion melt was maintained and extrusion could be effected. However, when the pressure and temperature were reduced in order to solidify the extrudate, uncontrolled loss of water occurred and poor fiber structure resulted. At the lower conditions of temperature and pressure, the polymer reverted to solid form and the water reverted to a separate liquid or gaseous phase within the extrudate structure which upon subsequent removal from the extrudate structure by drying left irreversible void structure therein. In the references discussed thus far, the nascent extrudate was solidified under conditions in which no control over water removal from the nascent extrudate was exercised (Bynum et al.), in which as much water as possible was removed (Blickenstaff), or in which as much water as possible was retained in the extrudate (Coxe).

In German Offenlegungsschrift No. 2,403,947 issued Aug. 8, 1974 to Porosoff (American Cyanamid), the first attempt to control water removal of an extruded polymer-water melt was disclosed. In this process, a polymer-water melt was extruded through a spinneret directly into a steam-pressurized solidification zone. The conditions maintained in the solidification zone were such that the melt solidified with controlled loss of warer, i.e., the rate of evaporation of water from the surface of the extrudate was such that a sheath-core structure was prevented. The steam conditions also maintained sufficient water content in the solidified extrudate so as to enable high levels of orientation stretching to be effected while the extrudate remained within the solidification zone and provided fiber of highly desirable physical properties for a wide variety of industrial applications. The fiber produced contained homogeneously dispersed void structure over the fiber cross-section which resulted in opaque character and limited utility to applications in which dyeability was not critical.

In copending applications Ser. No. 859,576 filed Apr. 12, 1978 and Ser. No. 853,014 filed Nov. 17, 1977, there are described respectively a process for preparing a void-free fiber and the resulting fiber wherein an acrylonitrile polymer-water melt is processed. In the processing taught in these applications, further control of the rate of water evaporation from the nascent extrudate is taught so that the resulting fiber will be transparent and have desirable dyeing characteristics for textile uses while retaining the desirable physical properties taught by Porosoff. Such processing includes using a hydrophilic acrylonitrile polymer as the fiber-forming polymer, limiting the content of water in the polymer-water melt extruded, extruding into a steam-pressurized solidification zone to control the release of water and maintain sufficient water to provide orientation stretching and removing residual water under controlled conditions of temperature and humidity.

Although acrylonitrile polymer fiber with acceptable textile properties can now be produced at commercial levels of production in accordance with the teachings of the copending applications discussed above, there nevertheless arise certain improvements over those teachings that further benefit the art. Such developments fulfill special needs and constitute significant advances in the art.

In accordance with the present invention, there is provided a polymer comprising repeating units of the structure:

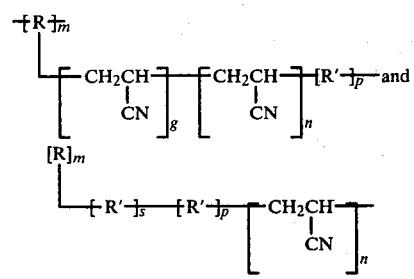

wherein R is a grafted poly(vinyl alcohol), R' represents repeating units derived from at least one monomer copolymerizable with acrylonitrile, m represents a weight fraction of about 0.01 to 0.10, q+n represents a weight fraction of about 0.80 to 0.89, p+s represents a weight fraction of about 0.01 to 0.19, the units represented by p and n occurring in random order and the kinematic molecular weight ($M_k$) of said polymer being from about 30,000 to 60,000.

The polymers of the present invention have a hydrophilic nature yet are of suitable composition to provide desirable fiber properties. Their hydrophilic nature enables them to bind and transport water from within to outside the fiber structure without the formation of a separate water phase when the polymer is used in melt-spinning using a steam-pressurized solidification zone as the environment into which the fusion melt is spun. This results after suitable fiber conditioning in a transparent melt-spun acrylonitrile polymer essentially free of voids which was a high level of dye intensity and reduced shade change due to hot-wet processing. These results in turn, lead to a commercially acceptable melt-spun acrylonitrile polymer fiber useful in textile applications.

The polymer composition of the present invention is obtained by grafting acrylonitrile and at least one additional monomer onto a polyvinyl alcohol. Surprisingly, when a mixture of polyvinyl alcohol and an acrylonitrile polymer is employed, the fiber obtained is poor in dye intensity and shows high shade change upon hot-wet processing.

In order to provide the polymer composition of the present invention, a suitable poly(vinyl alcohol) is employed. Such polymers are obtained by the hydrolysid of poly(vinyl acetate). Suitable poly(vinyl alcohols) include those that are hydrolyzed to 99% or greater and have degrees of polymerization of about 1,700 to 1,800, such as Elvanol 71-30G, for example. Other grades are also useful.

In preparing the polymer of the present invention, the amount of the poly(vinyl alcohol) taken is an amount which comprises about from about 1 to about 10 weight percent of the graft co-polymer composition. This preformed polymer is employed to provide the desired level of hydrophilicity while at the same time providing a grafted polymer that provides desirable fiber properties. If the content of poly(vinyl alcohol) units in the grafted polymer is too low, the desired hydrophilicity will not be obtained and no improvement over the conventional fiber-forming acrylonitrile polymer will ensue. On the other hand, if the content of poly(vinyl alcohol) units is too high, the graft polymer obtained will not provide the physical properties desired in acrylonitrile polymer textile fibers. Preferably, the poly(vinyl alcohol) will comprise about 2 to 8 weight percent of the graft polymer composition.

The monomers that are used to prepare a grafted poly(vinyl alcohol) include a major portion of acrylonitrile and a minor portion of at least one monomer copolymerizable with acrylonitrile. The amount of acrylonitrile will comprise from about 80 to 89 weight percent of the graft polymer composition and the monomer(s) copolymerizable therewith will comprise from about 1 to about 19 weight percent of the graft polymer composition. Such copolyerizable comonomers may be hydrophobic or hydrophilic in nature. Hydrophilic monomers tend to increase the hydrophilic nature of the resulting graft polymer and can reduce requirements for poly(vinyl alcohol) within the range specified. Suitable copolymerizable monomers may include one or more of the following illustrative monomers:

HYDROPHOBIC MONOMERS

Methyl acrylate, ethyl acrylate, butyl acrylate, methoxymethyl acrylate, beta-chlorethyl acrylate, and the corresponding esters of methacrylic acid and chloroacrylic acid; vinyl chloride, vinyl fluoride, vinyl bromide, vinylidene chloride, vinylidene bromide, allyl chloride, 1-chloro-1-bromoethylene; methacrylonitrile; methyl vinyl ketone; vinyl formate, vinyl propionate, vinyl stearate, vinyl benzoate; N-vinylphthalimide, N-vinylsuccinimide; methylene malonic esters; itaconic esters; N-vinylcarbazole; vinyl furan; alkyl vinyl ethers; diethyl citraconate, diethylmesaconate; styrene; dibromostyrene; vinyl naphthalene; 2-methyl-1-vinylimidazole; 4-methyl-1-vinylimidazole; 5-methyl-1-vinylimidazole; and the like.

HYDROPHILIC MONOMERS

Acrylic acid, methacrylic acid, alphachloroacrylic acid, itaconic acid, vinyl sulfonic acid, styrene fulfonic acid, p-methoxyallyl benzene sulfonic acid, acrylamidomethylpropanesulfonic acid, ethylene-α,β-dicarboxylic acids and their salts; acrylamide, methacrylamide, dimethylacrylamide, isopropylacrylamide; allyl alcohol; 2-vinylpyridine, 4-vinylpyridine, 2'-methyl-5-vinylpyridine; vinylpyrrolidone; vinylpiperidone; 1,2-di-hydroxypropylmethacrylate, hydroxyethyl methacrylate; 1-tri-methylammonium-2-hydroxypropyl methacrylate methosulfate; and the like.

In preparing the grafted poly(vinyl alcohol), the reactions are performed continuously in aqueous suspension and polymerized according to conventional procedures. Generally, the aqueous suspension contains about 15 to 40 weight percent of reactants. The reaction is then initiated and conducted at a suitable temperature and at a sufficient residence time. Free radical initiators such as azobis(isobutyronitrile) and the like may be used. Alternatively, or in combination, redox systems such as sodium persulfate-sodium bisulfate may be employed. Suitable chain transfer agents may be employed as necessary. Generally, reaction temperatures of about 40° to 80°C. are preferred and at these temperatures residence times of about 40 to 75 minutes are effective.

The polymer is obtained in the form of a slurry from which the polymer is recovered by centrifugation or other appropriate method and washed. The preferred embodiments provide the grafted polymer in monomer conversions in excess of 80% with greater than 95% utilization of the poly(vinyl alcohol).

DYE INTENSITY

A sample of fiber is dyed with Basic Blue 1 at 0.5 weight percent, based on the weight of fiber, to complete exhaustion. The dyed sample is then dried in air at room temperature and a reflectance measurement is made versus a control using the Color-Eye at 620 millimicrons. The control sample is a commercial wet spun acrylic fiber of the same denier dyed and handled in the same manner as the experimental fiber. The result is reported as the percent reflectance of that achieved by the control. In the case where the experimental fiber has more void structure than the control, there will be more light scattered and the dyed experimental fiber will register less than 100% reflectance at 620 millimicrons. The fiber will also appear to the eye to be lighter in color than the control.

SHADE CHANGE

A twenty gram sample of carded and scoured fiber is dyed with 0.5 weight percent of Calcozine Blue 6G, based on the weight of fiber, at the boil until complete exhaustion occurs. One portion of the dyed fiber is dried in air at room temperature. Another portion is dried in an oven at 300° F., for 20 minutes. Reflectances of both samples are obtained using the Color-Eye at 620 millimicrons. The change in reflectance of the oven-dried sample relative to the reflectance of the air dried sample is the shade change.

Kinematic average molecular weight (M) is obtained from the following relationship:

$$\mu = \frac{1}{A}\overline{M}_k$$

wherein $\mu$ is the average effluent time (t) in seconds for a solution of 1 gram of the polymer in 100 milliliters of 50 weight percent aqueous sodium thiocyanate solvent at 40° C. multiplied by the viscometer factor and A is the solution factor derived from a polymer of known molecular weight.

The invention is more fully illustrated in the examples which follow wherein all parts and percentages are by weight unless otherwise specified.

EXAMPLES

Comparative Example A

A polymer was prepared in a continuous reactor using the following percentage feed levels and conditions.

| | |
|---|---|
| Acrylonitrile (AN) | 27.2% |
| Methyl methacrylate (MMA) | 2.8% |
| Sodium chlorate | 0.1% |
| Sodium bisulfite | 0.01% |
| Sodium nitrate | 0.69% |
| Water | 68.2% |
| Reactor Temperature | 50° C. |
| Residence Time | 54 min. |

The polymer thus formed was thoroughly washed, and dewatered in a centrifuge. Washed polymer contained 89.3% acrylonitrile (AN) and 10.7% methyl methacrylate (MMA) and had $\overline{M}_k$ of 59,000. Percent conversion of monomer to polymer was 80.5%.

To 82.6 parts of polymer were added 17.4 parts water to provide a composition for a fusion melt. The composition was melted in an extruder and the melt was extruded through a spinnerette having 5016 orifices each of 140 micron diameter. The melt zone of the extruder was 168° C. and the pump outlet temperature was 171° C. Production rate was 60 lb per hour. The extrudate was extruded directly into a steam pressurized solidification zone pressurized with 22 psig saturated steam. The extrudate while within the steam pressurized solidification zone was stretched in a front stage at a ratio of 1.6 and in a second stage at a ratio of 10.0 relative to the linear speed of the fusion melt through the spinnerette to provide a total stretch of 16.1. The fiber as produced had a denier of 8 per filament.

The stretched tow was conditioned in a free-to-shrink state for 20 minutes at dry bulb temperature of 150° C. and a wet bulb temperature of 90° C. The conditioned fiber tow was then steamed in an autoclave at 123° C. for 15 minutes is a free-to-shrink condition. The total relaxation after conditioning and steaming was 30% and resulting filament denier was 11.5. This fiber showed a dye intensity of 44 versus commercially wet spun fiber of the same denier when dyed with Basic Blue 1 at 0.5% based on weight of fiber to complete exhaustion. The fiber had shade change of 45. Microscopic examination showed most of the filaments were structured.

EXAMPLE 1

In this example, a grafted polymer was prepared using the reactant charge and conditions as shown below.

| | |
|---|---|
| Acrylonitrile (AN) | 20.8% |
| Methyl methacrylate (MMA) | 2.3% |
| Elvanol 71-30G (PVA) | 1.9% |
| Potassium persulfate | 0.1% |
| Sodium bisulfite | 0.015% |
| β-mercaptoethanol | 0.07% |
| Cupric sulfate | 0.001% |
| Ammonium sulfate | 0.14% |
| Water | 74.7% |
| Reactor temperature | 60° C. |
| Residence time | 55 min. |

Washed polymer composition was 82.6% AN, 10.9% MMA. 6.5% PVA and $\overline{M}_k$ of 49,000. Percent conversion of monomer to polymer was 77%.

To 79.5 parts of polymer were added 20.5 parts water and 0.25 parts of glycerol stearate type lubricant. The polymer melt temperature was 177° C. and the pump outlet was 161° C. The melt was extruded at 28 lb./hr. through 120 micron/2937 hole spinnerette. Stretching was at a stretch ratio of 3.7 in a first stage and 34.1 total to yield a filament of 5 denier. The fiber was conditioned in a free-to-shrink state for 20 minutes in a conditioner maintained at 150° C. dry bulb and a wet bulb temperature of 90° C. The conditioned fiber was then steamed at 11 psi for 15 minutes in a free-to-shrink condition.

The total shrinkage was 32%, giving filament denier of 8 after processing. The fiber had dye intensity of 74 and a shade change of 3. Microscopic examination showed that fibers were well collapsed.

This example shows that fibers made from this grafted composition have higher apparent dyeability and better structure stability.

EXAMPLE 2

The grafted polymer composition of this example was prepared as follows:

| | |
|---|---|
| Acrylonitrile (AN) | 30.07% |
| Methyl methacrylate (MMA) | 3.71% |
| Elvanol 71-30G (PVA) | 1.05% |
| Acrylamido methyl propane sulfonic acids (AMPS) | |
| Potassium persulfate | 0.16% |
| Sodium bisulfite | 0.02% |
| β-mercaptoethanol | 0.16% |
| Cupric Sulfate | 0.002 |
| Ammonium sulfate | 0.18% |
| Water | 64.48% |
| Reactor temperature | 60° C. |
| Residence time | 55 min |

The composition of this polymer was 84.35% AN, 11.0% MMA, 3.5% PVA 0.25% AMPS and $\overline{M}_k$ of 41,900. Percent conversion of monomer to polymer was 84.4%.

To 85 parts polymer composition were added 15 parts water and 0.25 parts of glycerol stearate type lubricant. The spinnerette had 2937 holes each of 85 micron diameter. The polymer melt was at 171° C. and pump outlet temperature was 157° C. The melt was extruded at 30 lb./hr. Stretching in a first stage was at a stretch ratio of 2.3 and total stretch ratio was 21.6 to provide a filament denier of 2.1. The filaments were conditioned and steamed as in Example 2 during which processing shrinkage of 28% occurred to yield a fiber of 2.9 denier per filament. The fiber had an apparent dyeability of 89 and a shade change of 3. Microscopic examination showed that fibers were well collapsed.

EXAMPLE 3

Following the procedure of Example 2 with the exceptions noted, an additional polymer was prepared. Reactant, conditions and properties are summarized below.

| INGREDIENTS (Parts by Weight) | |
|---|---|
| Acrylonitrile | 30.22 |
| Methyl methacrylate | 3.73 |
| Poly(vinyl alcohol) | 1.05 |
| Potassium persulfate | 0.53 |
| Sodium bisulfite | 1.05 |
| Water | 63.42 |
| CONDITIONS | |
| Reaction Temperature (°C.) | 55 |
| Residence Time (minutes) | 60 |
| PROPERTIES | |
| Molecular Weight ($M_k$) | 37,100 |
| Solids (%) | 29.4 |
| Conversion (%) | 84.0 |
| Acrylonitrile (%) | 86.3 |
| Methyl methacrylate (%) | 11.2 |
| Poly(vinyl alcohol) (%) | 2.5 |

When this polymer was spun into fiber following the procedure of Example 2, the fiber obtained exhibited substantially the same dye intensity and shade change as that of Example 2.

COMPARATIVE EXAMPLE B

Using the acrylonitrile polymer prepared in Comparative Example A, a blend of 95 weight percent thereof and 5 weight percent of Elvanol 71-30G was prepared. To 82.6 parts of the blend were added 17.4 parts water to provide a composition for a fusion melt. Processing of the polymer-water melt was as in Comparative Example A. The resulting fiber had the same dye intensity and shade change as the fiber obtained in Comparative Example A.

This result shows that a physical blend of polyvinyl alcohol and an acrylonitrile copolymer does not provide the improved fiber dyeing propertis obtained with the graft co-polymers.

I claim:

1. A polymer comprising repeating units of the structure:

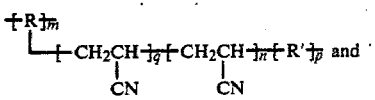 and

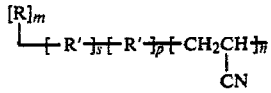

wherein R is a grafted poly(vinyl alcohol), R' represents repeating units derived from acrylamido methyl propane sulfonic acid and an acrylic ester selected from the group consisting of methyl acrylate, ethyl acrylate, butyl acrylate, methoxymethyl acrylate, beta-chloroethyl acrylate and the corresponding esters of methacrylic acid and chloroacrylic acid, m represents a weight fraction of about 0.01 to 0.10, q+n represents a weight fraction of about 0.80 to 0.89, p+s represents a weight fraction of about 0.01 to 0.19, the units represented by p and n occurring in random order and the kinematic molecular weight of the polymer being from about 30,000 to 60,000.

2. The polymer of claim 1 wherein R' represents repeating units of methyl methacrylate and acrylamido methyl propane sulfonic acid.

3. The polymer of claim 1 wherein m represents a weight fraction of 0.035.

4. The polymer of claim 1 wherein m represents a weight fraction of 0.065.

* * * * *